(12) United States Patent
Sun et al.

(10) Patent No.: US 12,505,320 B2
(45) Date of Patent: Dec. 23, 2025

(54) EMBEDDED RFID TAG READER

(71) Applicant: NATIONAL RESEARCH COUNCIL OF CANADA, Ottawa (CA)

(72) Inventors: Jian Sun, Richmond (CA); Jianquan Hu, Burnaby (CA); Shiqiang Hui, Vancouver (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 9 days.

(21) Appl. No.: 18/384,136

(22) Filed: Oct. 26, 2023

(65) Prior Publication Data
US 2024/0143954 A1    May 2, 2024

Related U.S. Application Data

(60) Provisional application No. 63/420,162, filed on Oct. 28, 2022.

(51) Int. Cl.
*G06K 7/10* (2006.01)
*G06F 13/42* (2006.01)
*G06K 7/00* (2006.01)

(52) U.S. Cl.
CPC ..... *G06K 7/10366* (2013.01); *G06F 13/4282* (2013.01); *G06K 7/0008* (2013.01)

(58) Field of Classification Search
CPC ............. G06K 7/10366; G06K 7/0008; G06K 7/10356; G06F 13/4282; H04B 1/713
See application file for complete search history.

(56) References Cited

U.S. PATENT DOCUMENTS

2006/0082444 A1* 4/2006 Sweeney ................... G07C 9/28
340/10.3
2020/0259520 A1* 8/2020 Crisp ................. G06K 7/10356

FOREIGN PATENT DOCUMENTS

CA    2922137 C    7/2018

* cited by examiner

*Primary Examiner* — Vernal U Brown
(74) *Attorney, Agent, or Firm* — Perry + Currier Inc.

(57) ABSTRACT

A method and apparatus are set forth for reading RFID tags through a medium, comprising positioning a plurality of interrogator rings in relation to the medium, each interrogator ring having a field controller connected to a plurality of antenna modules, wherein each of the antenna modules is positioned over a respective RFID tag, and connecting the host device and plurality of interrogator rings in a node-gateway configuration over a serial bus to enable the host device to communicate with and provide power to each field controller for interrogating the RFID tags via the plurality of antenna modules.

16 Claims, 9 Drawing Sheets

EMBEDDED RFID TAG READER

BACKGROUND OF THE INVENTION

1. Field of the Invention

The present invention is directed to radio frequency identification (RFID) systems, and more particularly to a method and apparatus for reading RFID tags through a medium.

2. Description of the Related Art

RFID is a form of wireless communication that incorporates the use of electromagnetic coupling in the radio frequency portion of the electromagnetic spectrum to uniquely identify an object. In conventional RFID systems, communication between an RFID interrogator and RFID tag occurs over the air (OTA), which is a nearly ideal medium. However, when the RFID tags and RFID interrogator are separated by a medium that is not able to absorb electromagnetic waves, such as rubber, the properties of the electromagnetic field for radio wave propagation change, which can present a challenge to effective communication between the RFID interrogator and RFID tag.

SUMMARY OF THE INVENTION

In an aspect, an apparatus is set forth for accessing RFID tags that are separated by a medium that is not able to absorb electromagnetic waves, and which is designed to survive in a harsh environment for use in various fields of industry. In particular, in order to address the challenge to effective communication between the RFID interrogator and multiple RFID tags separated by such a medium, an interrogator is set forth that uses a serial bus to connect a microcontroller to a reader for reading multiple tags rather than one tag per reader, as in conventional systems.

According to an embodiment, an apparatus for reading RFID tags through a medium is set forth, comprising a host device, a plurality of interrogator rings, each having a field controller, a plurality of antenna modules connected to the field controller and a structure for mounting the field controller and the plurality of antenna modules in relation to the medium such that the position of each antenna module is centered over an RFID tag, and a serial bus for connecting the host device and plurality of interrogator rings in a node-gateway configuration to enable the host device to communicate with and provide power to each field controller for interrogating the RFID tags via the plurality of antenna modules.

According to another embodiment, a method of reading RFID tags though a medium is set forth, comprising positioning a plurality of interrogator rings having a field controller connected to a plurality of antenna modules in relation to the medium such that the position of each antenna module is centered over an RFID tag, and connecting the host device and plurality of interrogator rings in a node-gateway configuration over a serial bus to enable the host device to communicate with and provide power to each field controller for interrogating the RFID tags via the plurality of antenna modules.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1A:
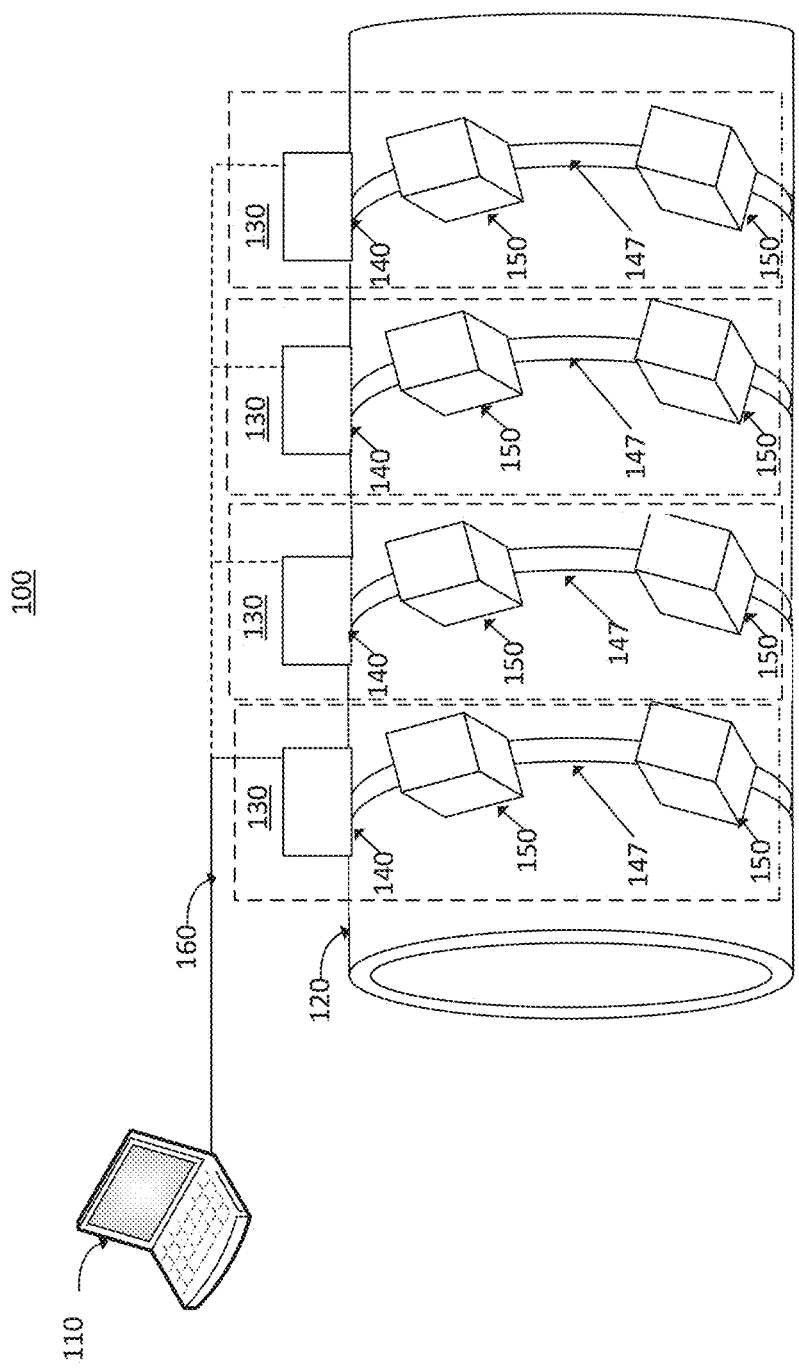
FIG. 1A is a perspective view of an apparatus for reading RFID tags for reading embedded RFID tags, according to an embodiment.

FIG. 1A shows an apparatus 100 for reading RFID tags through a medium, such as rubber hose 120, according to an embodiment. In one application, the apparatus 100 may be used to detect wear inside the rubber hose 120. A host device 110 is connected to at least one of a plurality of interrogator rings 130, each including a field controller 140, a plurality of antenna modules 150 connected to the field controller 140 via cables 145, and a mounting bracket 147 for mounting the field controller 140 and plurality of antenna modules 150 to the rubber hose 120. Communication between the host device 110 and interrogator rings 130, as well as power to the interrogator rings 130 is via a serial bus 160, as discussed in greater detail below. In an embodiment, serial bus 160 is a RS485 serial bus.

The host device 110 and interrogator rings 130 are configured as a node-gateway to enable the host device to communicate with the plurality of slave nodes (rings 130) over the serial bus 160.

The node-gateway connection and communication (physical connection) enables all rings 130 to be connected with one gateway (i.e. host device 110) on the same section of the serial bus 160. Individual interrogator rings 130 can be connected to the host device 110 by selecting a COM port on the host device 110 dedicated to each interrogator ring 130 (i.e. slave node).

Figure 1B:
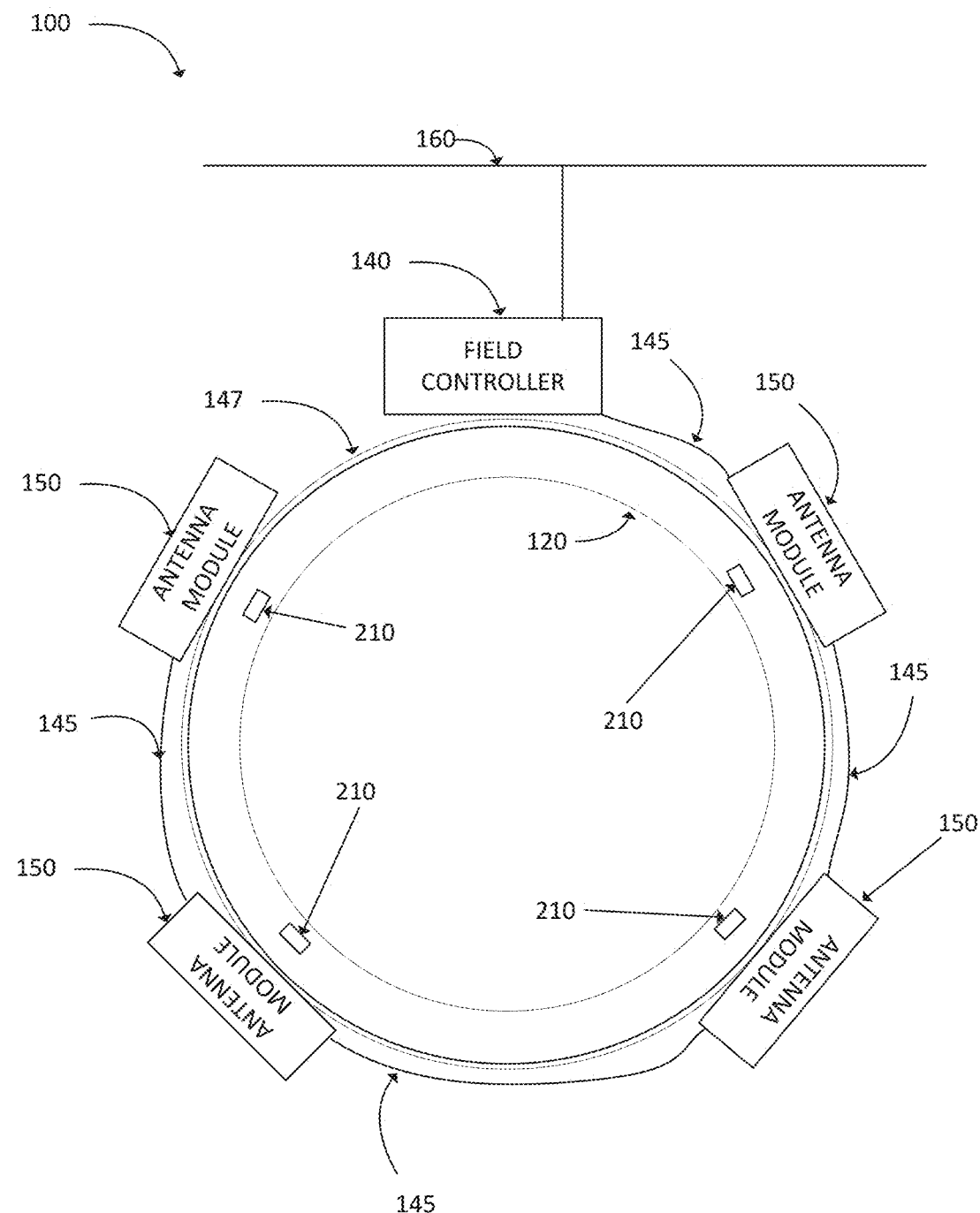
FIG. 1B is an end view of the apparatus shown in FIG. 1A.

As shown in FIG. 1B, which is an end view of the rubber hose 120, each interrogator ring 130 comprises a field controller 140 and plurality of antenna modules 150 mounted to rubber hose 120 via bracket 147 to form a ring for detecting the RFID tags 210. In embodiments, a surface of the field controller 140 and/or antenna modules 150 can be curved for flush mounting to the rubber hose 120. The multiple antenna modules 150 are connected to the field controller 140 via cables 145. Preferably, the position of each antenna module 150 is centered over an RFID tag 210 to be detected. Although the illustrated embodiment shows one field controller 140 and four antenna modules 150, in alternative embodiments there may be greater or fewer than four antenna modules 150 for each field controller 140, and as shown in FIG. 1, apparatus 100 may include multiple rings 130 for detecting wear over extended lengths of the rubber hose 120.

Figure 2:
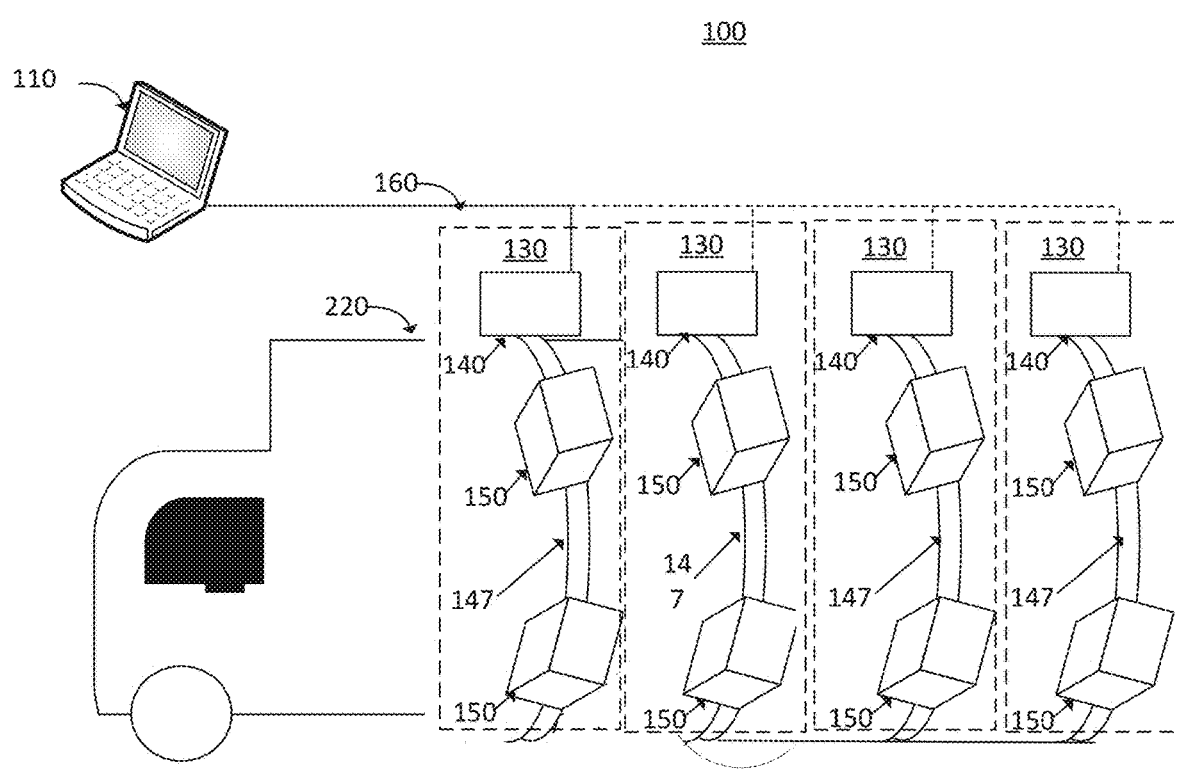
FIG. 2 is an end view of an apparatus for reading RFID tags through a medium, according to an embodiment.

FIG. 2 shows apparatus 100 used in an application for reading multiple RFIDs in a transportation and logistics scenario where the RFID tags are read through a variety of materials such as materials for constructing the cargo enclosure walls of a transport truck 220, wherein a plurality of interrogator rings 130 are positioned, for example in a loading depot checkpoint for confirming cargo that has been loaded on the truck 220.

A person of skill in the art will understand that the principles described herein can be applied to numerous applications other than RFIS tags embedded in rubber hose 120 or in a transport truck 220 (e.g. cargo in freight train cars, etc.), wherein the number, size and shape of the interrogator rings 130 can be varied to ensure rapid reading and proper material penetration to suit the intended application.

Figure 3:
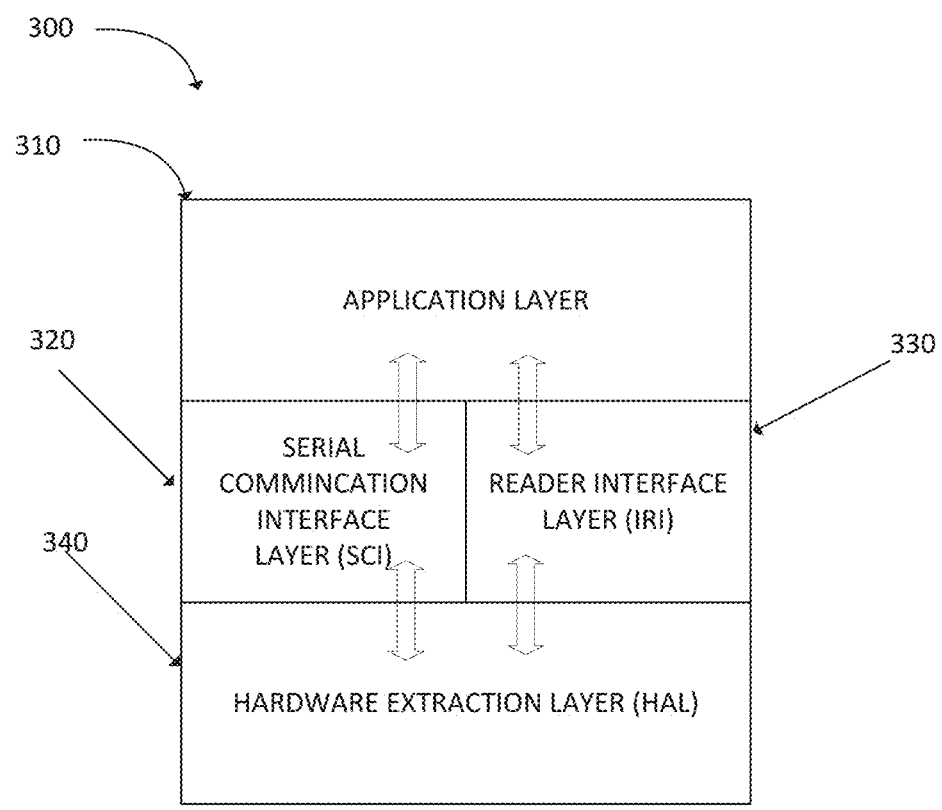
FIG. 3 is a block diagram of firmware to manage and control the operation of interrogator rings, according to an embodiment.

As shown in FIG. 3, field controller 140 implements firmware 300 to manage and control the operation of interrogator rings 130, including all data exchange traffic, diagnostics and operation status reporting to the host device 110. The architecture of the firmware 300 includes an application layer 310, serial communication interface layer (SCI) 320, reader interface layer (IRI) 330 and hardware extraction layer (HAL) 340.

Figure 4:
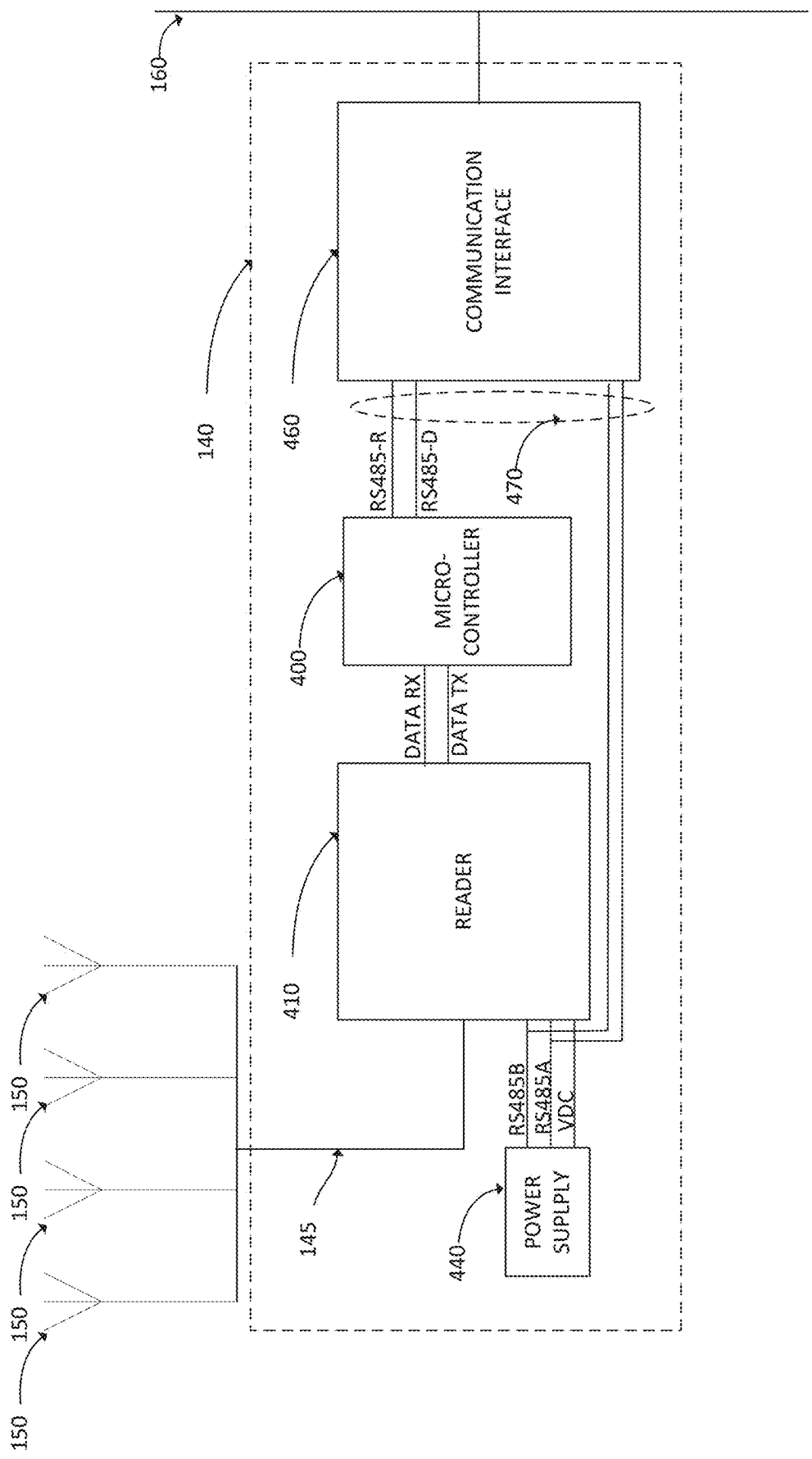
FIG. 4 is a block diagram of a field controller, according to an embodiment.

An embodiment of field controller 140 is shown in FIG. 4, comprising a microcontroller 400 for implementing hardware extraction layer 340, a reader 410 to which the plurality of antenna modules 240 are connected, a power supply 440 and a communication interface 460. In an embodiment, microcontroller 400 is a STM32G081CBU6 manufactured by STMicroelectronics, and reader 410 is an RFID module/chip, (e.g. Indy RS2000 integrated RAIN RFID reader module manufactured by Impinj). An internal RS485 serial bus 470 connects Firmware 300 implements the following operations: initializing serial communication interface layer 320 to enable communication over serial bus 160 via communication interface 460; initializing reader interface layer 330 to enable communication with reader 410, initializing and configuring the reader 410 via the reader interface layer 330, performing commands from the host device 110 received over serial communication interface layer 320, starting reader inventory operations via the reader interface layer 330, reading internal memory of the reader 410, and outputting data collected from reader 410 to the serial communication interface layer 320 for communication to host device 110 over serial bus 160.

Serial communication interface layer 320 provides functionality to manage and control data exchange and communication with the hardware extraction layer 340 and application layer 310, including listening for incoming a message from host device 110, receiving the incoming message, decrypting, decoding and interpreting the incoming message, directing the application layer 310 to perform a desired operation in response to the received message, interacting with the application layer 310 to obtain data collected from the reader interface layer 330, and sending the encoded and encrypted message to the host device 110 in response to the received incoming message.

In an embodiment, the serial communication protocol that is used by serial communication interface layer 320 follows OSI 7-layer model standardized in ISO 7498 and ITU-T X.200, but with a simplified implementation for a PMPP (point-to-multipoint protocol).

The communication transaction frame payload is as follows:

| SOH | STX | Ver. No. | Address | Data Length | CMD | Payload | CRC L | CRC H | ETX | EOT |

The Version Number, Address, Data Length, CMD and Data Payload fields are Base64 encoded so that the resulting transaction frame is transferred in ASCII format. The transport layer is implemented by the two-byte Data Length field to transfer variable-length data from a source node to a destination node. The Data Length specifies the number of data bytes in the Data Payload field plus one for the CMD field. With respect to the data link layer, the serial communication protocol conforms to a node-gateway protocol, as discussed above, a single host communicates with a plurality of slave nodes (rings 130) over the serial bus 160. Communication activity is always initiated by the host device 110. The slave nodes (rings 130) do not transmit data without receiving a request from the host device 110, and also do not communicate with each other.

A communication transaction frame begins with two start bytes SOH 0x01 (start of heading) and STX 0x02 (start of text), and terminates with ETX 0x03 (end of text) and EOT 0x04 (end of transmission).

Following the two start bytes, there is a one-byte Version Number field, and one-byte Address field. The Version Number identifies the meaning of the following payload and is used to interpret the data. The Address field comprises an address space with a maximum of 256 addresses for the node-gateway link. The address 0 is reserved as the broadcast address used by the master node (host device 110) to send a message to all slave nodes (rings 130). The addresses 1 to 255 are the unique addresses of the slave nodes (rings 130). The master node (host device 110) has no specific address.

The CMD and Data Payload fields include the operation and application data. The serial communication interface layer 320 translates the CMD and directs the required operations to application layer 310, or assembles the two fields together. Host device 110 initiates a communication transaction with a specific CMD, and the destination slave node (ring 130) responds to the host device 110 with the same CMD.

In an embodiment, the physical layer conforms to the RS485 specification in EIA/TIA-485 and is applied and a 2-wire RS485 bus 160. A balanced twisted pair wire may be used for RS485 A and RS485 B, and an additional pair used for delivery +5V bus supply and common ground. The serial data link operates in half duplex mode with a baud rate of from 2400 to 921600 bps (default baud rate 115200 bps). In addition to the RS485 bus 160 one additional pair wire may be included to deliver system power supply from the host device 110 to the nodes (rings 130). The maximum number of nodes that can be connected on bus 160 without a repeater is 32.

The application layer 310 is the OSI layer closest to the end user at host device 110, such that both the application layer 130 and the user interact directly with the software application. Layer 310 interacts with software application programs for functions such as identifying communication partners, determining resource availability, and synchronizing communication.

Figure 5A:
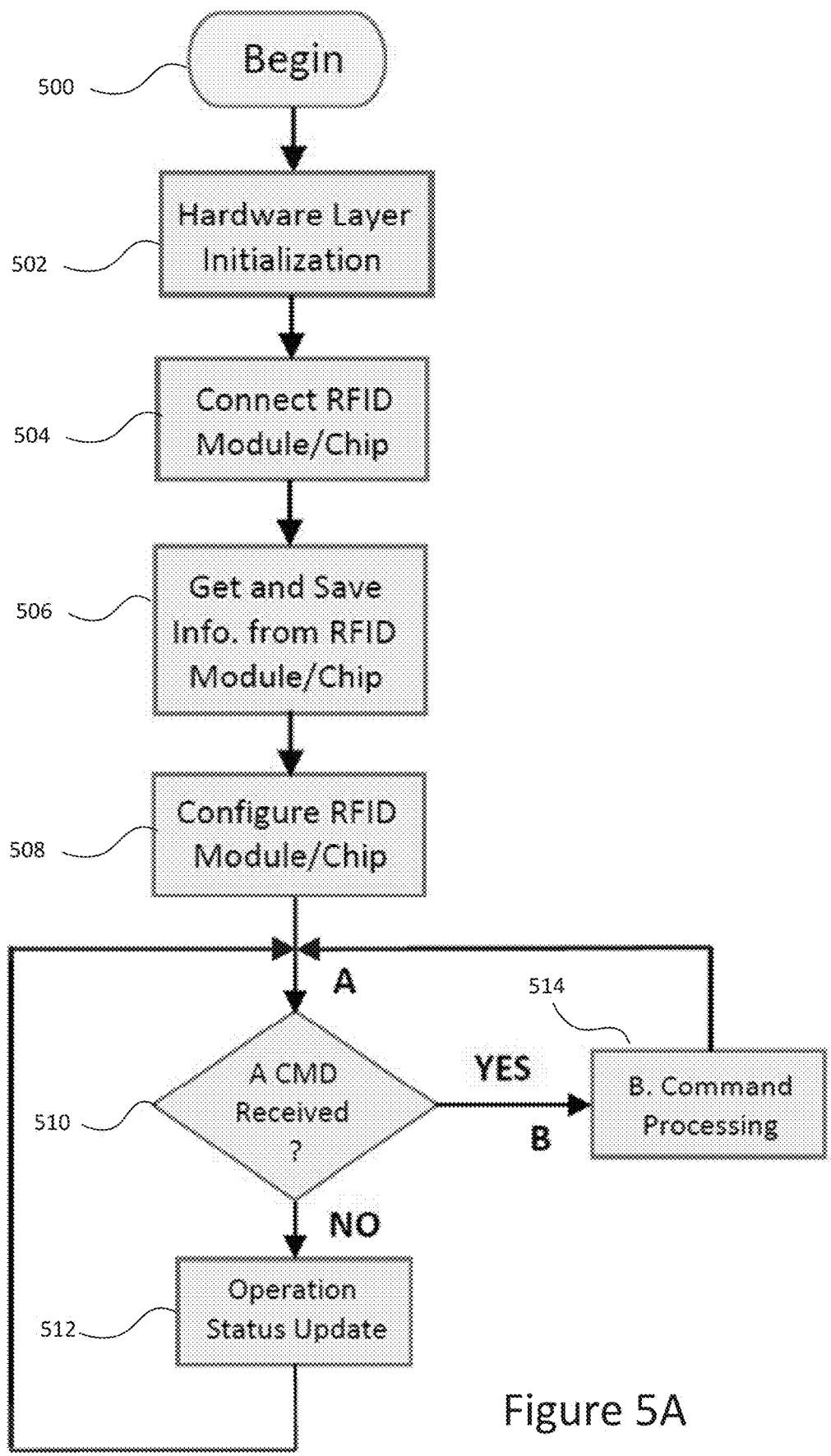
FIG. 5A is flowchart showing a method of operation of the apparatus of FIGS. 1-2 and 4 via the firmware of FIG. 3, according to an embodiment.
Figure 5B:
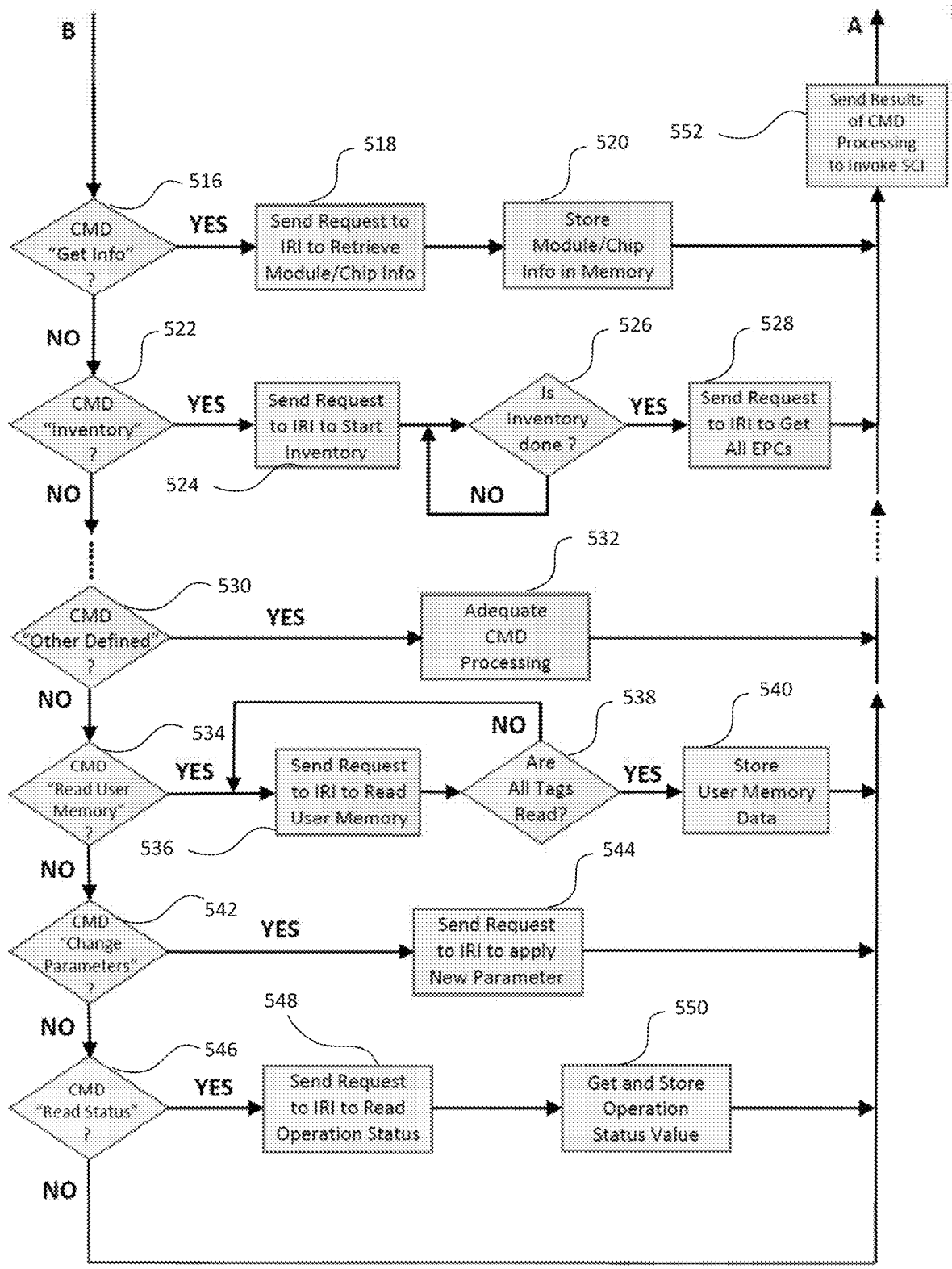
FIG. 5B is a flowchart showing details of command processing steps of the method shown in FIG. 5A.
Figure 5C:
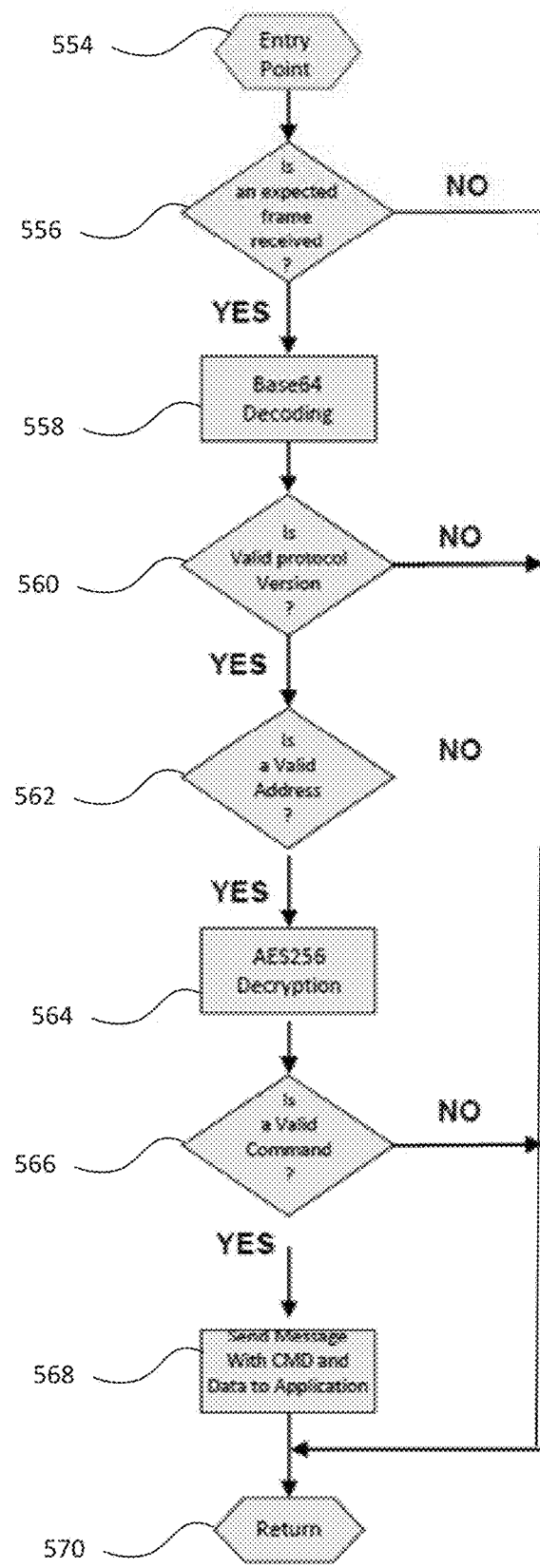
FIG. 5C is a flowchart showing details of processing and receiving steps of the method shown in FIG. 5A for a serial communication interface layer.
Figure 5D:
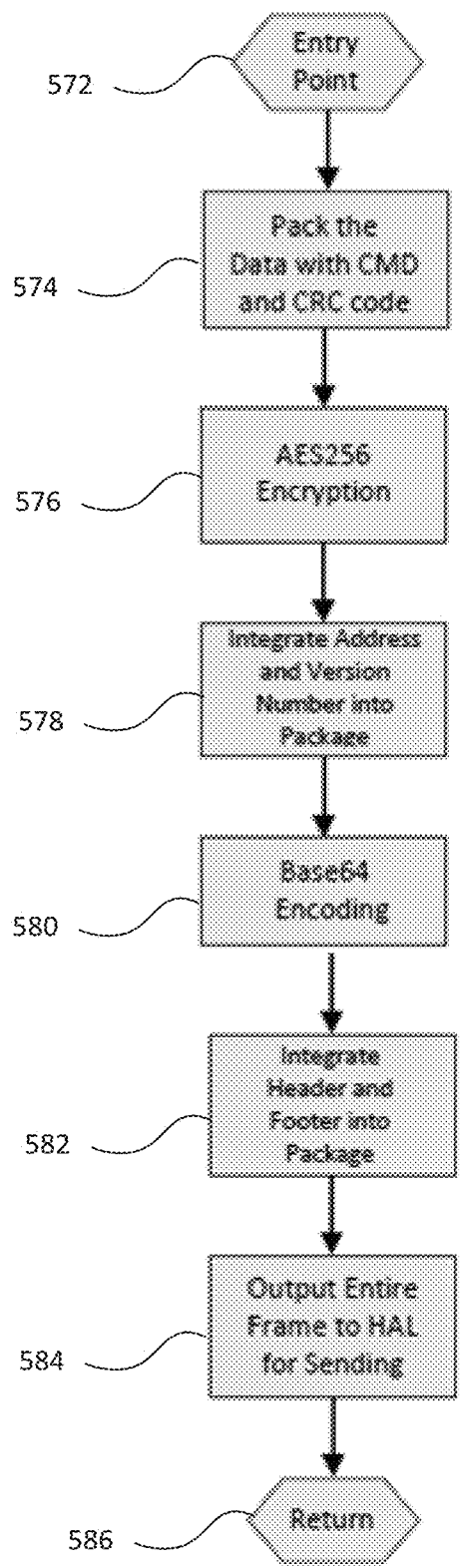
FIG. 5D is a flowchart showing details of processing and receiving steps of the method shown in FIG. 5A for a serial communication interface layer.

A flowchart showing a method of operation of apparatus 100 via firmware 300, is shown in FIG. 5, comprising FIGS. 5A-5D, where FIG. 5A shows processing steps for application layer 310, FIG. 5B shows command processing steps, FIG. 5C shows processing and receiving steps for serial communication interface layer 320 and FIG. 5D shows processing and outputting steps for serial communication interface layer 320.

At 500, the method begins. At 502, field controller 140 initializes the hardware extraction layer (microcontroller 400) 340. At 504, field controller 140 connects reader. Host 110 retrieves and saves device information from reader 410 at 506, and then configures the reader 410 at 508. At 510, field controller 140 listens for a command (CMD) from host 110 over the serial communication interface layer 320. If no CMD is received (step 512), step 510 is repeated until a CMD is received. Upon receipt of a CMD, at 514, the CMD is processed as shown in FIG. 5B.

At 516, on receipt of a "Get Info" CMD from host 110, field controller 140 sends a request via the reader interface layer (IRI) 330 to retrieve information from reader 410, at 518. The retrieved information is stored in memory of microcontroller 400 at 520.

At 522, on receipt of an "Inventory" CMD from host 110, field controller 140 sends a request via the reader interface layer (IRI) 330 to start a reader inventor, at 524. Once the inventory is complete (step 526), field controller 140 sends a request via the reader interface layer (IRI) 330 to get all (Electronic Product Codes (EPCs), at 528. An Electronic Product Code (EPC) is a universal identifier that gives a unique identity to a specific physical object. This identity is designed to be unique among all physical objects and all categories of physical objects in the world, for all time. In most instances, EPCs are encoded on RFID tags and can be used to track a variety of objects including: trade items, fixed assets, documents, or reusable transport items. Thus, in the application shown in FIG. 2, cargo items within the truck 220 can be identified using RFID tags that have been encoded with a relevant EPC.

At 530, on receipt of an "Other Defined" CMD from host 110, field controller 140 performs adequate CMD processing, at 532 using the default command-line interpreter for the host device 110 running OS/2, eComStation, ArcaOS, Microsoft Windows (Windows NT family and Windows CE family), and ReactOS operating systems.

At 534, on receipt of a "Read User Memory" CMD from host 110, field controller 140 sends a request via the reader interface layer (IRI) 330 to start reading the RFID tags 210, at 536. Once all RFID tags have been read (step 526), field controller 140 sends a request via the reader interface layer (IRI) 330 to store the read data, at 5540.

At 542, on receipt of a "Change Parameters" CMD from host 110, field controller 140 sends a request via the reader interface layer (IRI) 330 to apply a new parameter, at 544.

At 5486, on receipt of a "Read Status" CMD from host 110, field controller 140 sends a request via the reader interface layer (IRI) 330 to read operation status, at 546, which then retrieves and stores the operation status values, at 550.

The result of each CMD is then returned to host 110. over serial bus 160 via the serial communication interface layer (SCI) 320, at step 552

FIG. 5C shows processing and receiving steps for serial communication interface layer 320, beginning at 554. If an expected frame of data is received at step 556, Base64 decoding is performed at 558. If the frame contains a valid protocol version at 560, then if the address is valid, at 562, AES256 decryption is performed at 564. If the received command is valid at 566, the message from FIG. 5C is sent to the host with data and CMD via the hardware extraction layer (HAL) 340, at 568, and at 570 process flow returns to the entry point 554.

FIG. 5D shows processing and outputting steps for serial communication interface layer 320, beginning at 572. At 574, the data is packed with the CMD and CRC code. At 576, AES256 decryption is performed. The address and version number are integrated into the data package at 578. Base64 encoding is performed at 580. The header and footer are integrated into the data package at 582. Then, at 584, the entire frame of data are output via the hardware extraction layer (HAL) 340, and at 586 process flow returns to the entry point 572.

The hardware architecture of the interrogator has been designed and illustrated in the following diagram.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus for reading radio frequency identification (RFID) tags through a medium, comprising:
 a host device;
 a plurality of interrogator rings, each having a field controller, a plurality of antenna modules connected to the field controller and a structure for mounting the field controller and the plurality of antenna modules in relation to the medium such that the position of each antenna module is centered over an RFID tag; and
 a serial bus for connecting the host device and plurality of interrogator rings in a node-gateway configuration to enable the host device to communicate with and provide power to each field controller for interrogating the RFID tags via the plurality of antenna modules.

2. The apparatus of claim 1, wherein the field controller includes a microcontroller, a reader to which the plurality of antenna modules are connected, a power supply and a communication interface.

3. The apparatus of claim 2, wherein the microcontroller implements firmware to manage and control operation a respective one of the plurality of interrogator rings, including at least one of data exchange traffic, diagnostics and operation status reporting.

4. The apparatus of claim 3, wherein the firmware includes an application layer, a serial communication interface layer, a reader interface layer and a hardware extraction layer.

5. The apparatus of claim 4, wherein the firmware is configured to:

initialize the serial communication interface layer to enable communication over the serial bus via the communication interface;

initialize the reader interface layer to enable communication with the reader;

initialize and configure the reader via the reader interface layer;

perform commands received from the serial communication interface layer;

perform reader inventory operations via the reader interface layer;

read internal memory of the reader; and output data collected from the reader to the serial communication interface layer for communication to the host device over the serial bus.

6. The apparatus of claim 4, wherein the serial communication interface layer is configured to manage and control data exchange and communication with the hardware extraction layer and application layer.

7. The apparatus of claim 6, wherein managing and controlling data exchange and communication comprises:

listening for an incoming a message from the microcontroller;

receiving the incoming message;

decrypting, decoding and interpreting the incoming message;

directing the application layer to perform a desired operation in response to the received incoming message;

interacting with the application layer to obtain data collected from the reader interface layer;

encoding and encrypting the data; and sending the encoded and encrypted message to the host device in response to the received incoming message.

8. The apparatus of claim 2, wherein the microcontroller, reader, power supply and communication interface are connected to an internal serial bus.

9. The apparatus of claim 8, wherein the serial bus and internal serial bus are each a 2-wire bus.

10. The apparatus of claim 9, wherein the serial bus and internal serial bus conform to RS485.

11. The apparatus of claim 10, wherein the serial bus and internal serial bus comprise a 2-wire RS485 balanced twisted pair wire bus and further include an additional wire pair for delivery +5V bus supply and common ground.

12. The apparatus of claim 11, wherein the serial bus and internal serial bus operate in half duplex mode with a baud rate of from 2400 to 921600 bps.

13. The apparatus of claim 12, further comprising an additional wire pair to deliver system power supply from the host device to the interrogator rings.

14. A method of reading radio frequency identification (RFID) tags through a medium, comprising:

positioning a plurality of interrogator rings having a field controller connected to a plurality of antenna modules in relation to the medium such that the position of each antenna module is centered over an RFID tag; and connecting a host device and plurality of interrogator rings in a node-gateway configuration over a serial bus to enable the host device to communicate with and provide power to each field controller for interrogating the RFID tags via the plurality of antenna modules.

15. The method of claim 14, further comprising:

listening at the field controller for an incoming a message from the host device;

receiving the incoming message at the field controller;

decrypting, decoding and interpreting the incoming message at the field controller; and performing a desired operation in response to the received incoming message.

16. The method of claim 15, wherein performing the desired operation comprises:

obtaining data from the field controller;

encoding and encrypting the data; and sending the encoded and encrypted data to the host device in response to the received incoming message.

* * * * *